No. 801,601. PATENTED OCT. 10, 1905.
L. M. MORROW.
WEEDING HARROW.
APPLICATION FILED JUNE 8, 1905.
2 SHEETS—SHEET 1.
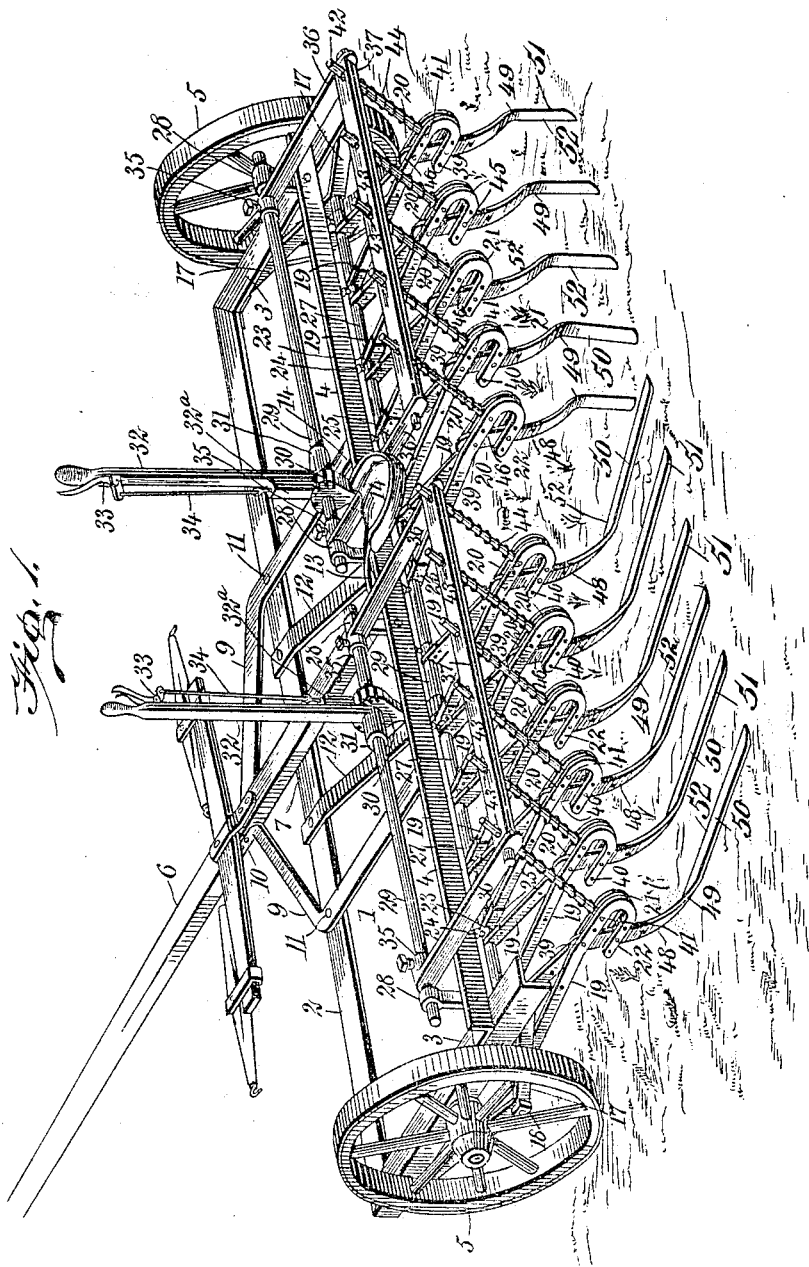
WITNESSES:
H. G. Dieterich
E. E. Ellis
INVENTOR
Louis M. Morrow
BY Munn
ATTORNEYS

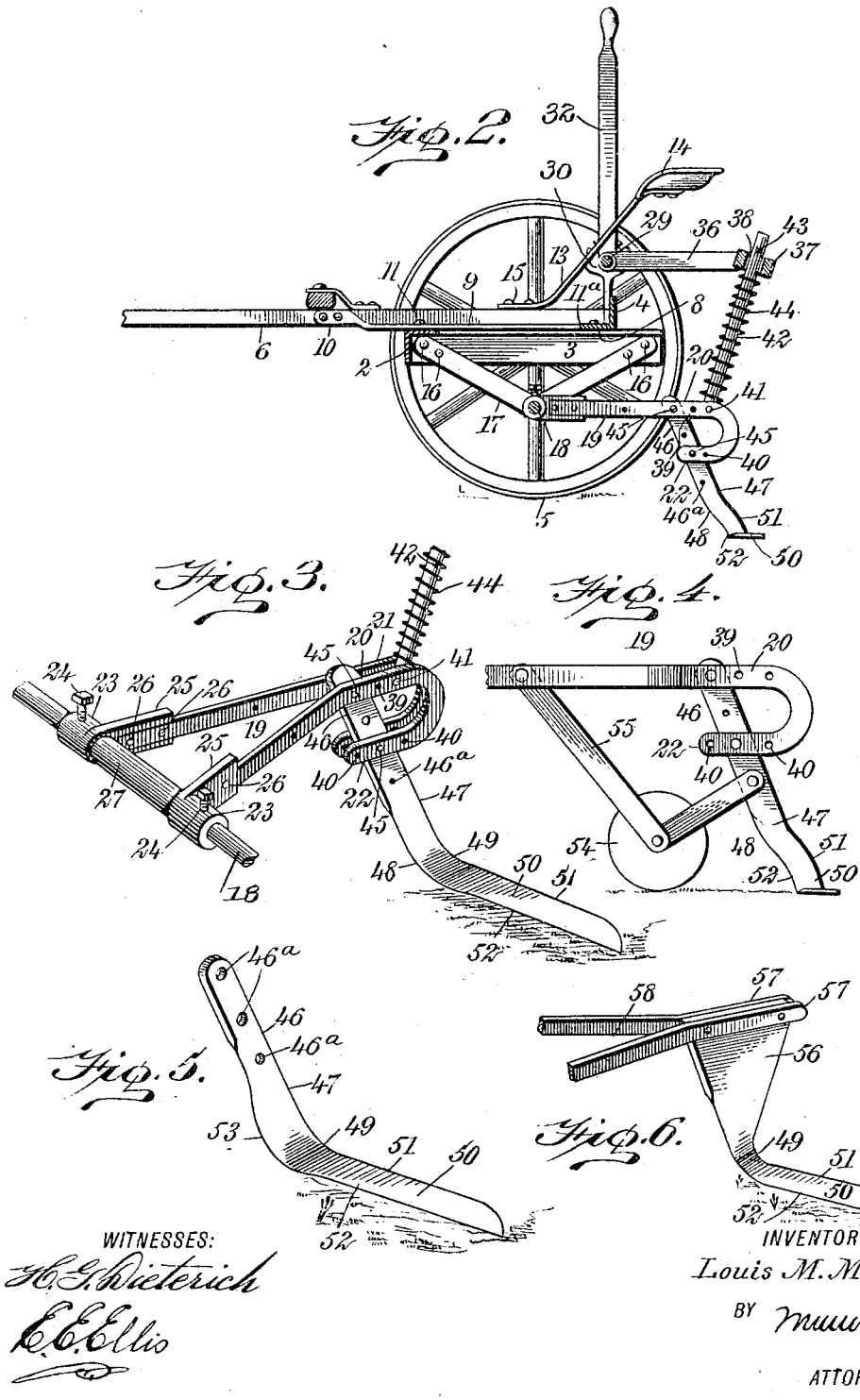

UNITED STATES PATENT OFFICE.

LOUIS MONROE MORROW, OF WASCO, OREGON, ASSIGNOR OF ONE-FOURTH TO LOUIS M. MORROW, ONE-FOURTH TO WILLIAM B. CAMPBELL, ONE-FOURTH TO FRANK L. MORROW, AND ONE-FOURTH TO ROY C. ATWOOD, OF WASCO, OREGON.

WEEDING-HARROW.

No. 801,601.      Specification of Letters Patent.      Patented Oct. 10, 1905.

Application filed June 8, 1905. Serial No. 264,269.

*To all whom it may concern:*

Be it known that I, LOUIS MONROE MORROW, a citizen of the United States, and a resident of Wasco, in the county of Sherman and State of Oregon, have invented a new and Improved Weeding-Harrow, of which the following is a full, clear, and exact description.

This invention relates to weeding harrows or plows; and it consists, substantially, in the details of construction and combinations of parts hereinafter more particularly described, and pointed out in the claims.

One of the principal objects of the invention is to provide a weeding harrow or plow of such an embodiment as to overcome numerous disadvantages and objections common to many other structures hitherto devised for similar purposes.

A further object is to provide a weeding harrow or plow which is simple in construction and strong and durable throughout, besides being easy of manipulation and control and comparatively inexpensive to manufacture.

A still further object is to provide a weeding harrow or plow which is thoroughly effective and reliable in use, besides possessing the capacity for long and repeated service and comprising but few parts not liable to get out of order or become easily distorted or broken.

The above and additional objects are attained by means substantially such as are illustrated in the accompanying drawings, in which—

Figure 1 is a rear perspective view of a weeding harrow or plow embodying my improvements. Fig. 2 is a transverse sectional view thereof. Fig. 3 is a perspective view in detail representing more clearly the preferred form of weed cutter or knife employed, as well as the supporting-bracket therefor, together with the means for spacing the brackets from each other and the means for preventing inward springing of the duplicate members of which each bracket is constructed. Fig. 4 is a side view in detail showing the rotary colter sometimes employed in advance of each of the cutters or knives, and Figs. 5 and 6 each represent a perspective view of a modified form of the cutter or knife.

Before proceeding with a more detailed description it may be stated that in the form of my improvements herein shown I employ a specially-constructed main frame for the support and attachment thereto of the several operative elements or parts of the structure, said frame being suitably mounted on wheels and provided with a draw-bar and suitable appliances for the hitching thereto of draft-animals in the usual manner. In addition to the main frame I employ duplicate supplementary frames of special construction, together with specially-constructed cutters or knives and specially-constructed supporting-brackets therefor, said cutters or knives and brackets each being grouped or mounted in duplicate series, those of one series being reversely disposed to those of the other and those of each series having independent cooperative relation with one of the duplicate supplementary frames referred to. Special means are provided by which the cutters or knives of one or both series may be operated at will to enter or penetrate the soil to the desired extent to effect the cutting and upturning of the weeds, and by the same means both series of cutters or knives may be elevated from the surface of the soil to facilitate either the turning of the harrow or the transfer of the same from one field to another.

Other special features of construction and organization of parts are employed, as will presently appear, and while I have herein represented my improvements in a certain preferred embodiment it will be understood that I do not limit myself thereto in precise detail, since immaterial changes therein may be made coming within the scope of my invention.

Reference being had to the drawings by the designating characters marked thereon, 1 represents in entirety the main supporting-frame of my improved weeding-harrow, the same being preferably oblong or rectangular in form and comprising the forward longitudinally-extending member 2, the rearwardly-extending end members 3, connecting with the ends thereof at their forward ends, and the rearward longitudinally-extending member 4 with parallel member 2 and rigidly secured in place near each end upon one of the said end members 3 a suitable distance from the end thereof, each of the members referred to being preferably constructed of angle-iron, although any other suitable material may be employed therefor. Said main frame is suitably mounted on wheels 5, journaled at the ends thereof, while centrally thereof is a forwardly-extending draft-bar 6, supported and secured in place in any suitable manner at 7 and 8, respectively, upon the longitudinal members 2 and 4 of the main frame. (See Figs. 1 and 2.) On each side of the said draft-bar 6 is an angular brace 9, having the forward end thereof secured thereto at 10 and to the frame member 2 at 11, the rearward end thereof abutting against the forward edge of the frame member 4, as indicated at 11ª in Fig. 2. Other braces 12 are employed between the members 2 and 4 of the main frame on each side of the draft-bar and within the said angular braces 9, while a suitable support 13 for a seat 14 for the operator is mounted in any suitable manner upon the rearward portion of said draft-bar 6, as indicated at 15 in Fig. 2.

Secured at 16 (see Fig. 2) to the inner surfaces of the frame members 3 at the ends are the upper ends of substantially V-shaped hangers 17, and supported in these hangers at the angles or apices thereof are the ends or journals of a rigid longitudinal shaft 18, upon which are loosely mounted at their forward terminals the duplicate series of rearwardly-extending brackets 19, the duplicate members of each of which are divergent from each other forwardly of the harrow and are brought into parallelism at 20, leaving a space 21 between them, whence they are bent or turned under to form parallel forward extending rearward terminal portions 22, as shown. As a convenient means for mounting the said forward terminal portions of the members of each of said brackets upon the shaft 18 I preferably employ metal collars 23 (see Fig. 3) upon said shaft and which may or may not have set-screws 24 and each of which is formed with a rearwardly-extending integral arm 25, recessed lengthwise on its inner surface and receiving one of said forward terminal portions flush therewith, the fastening between the two being made by screws or rivets 26 or in any other suitable way. Also held upon the shaft 18 between the said collars 23 of each pair are metal sleeves 27, each of which assists in securing to the shaft the bracket 19, with which it coöperates, besides preventing the divergent portions of the members of said bracket from springing inwardly or toward each other, the effect being to impart strength to the connection between each bracket and the shaft, as will be apparent.

Supported in duplicate sets of bearings 28 therefor on the main frame 1 are duplicate rock-shafts 29, extending lengthwise of said frame in alinement with each other, each of said shafts passing through a rigidly-supported semicircular ratchet 30 and having rigidly mounted thereon at or near its inner end the hub 31 of an upstanding operating-lever 32, provided with any ordinary means, as a pawl, (not shown,) working in a guide 32ª for engaging said ratchets 30 and operated from a pivoted thumb-lever 33 by means of the connecting-rod 34 in a manner well understood. Secured to each of said rock-shafts 29 near the ends thereof at 35 are the forward ends of the side members 36 of a rearwardly-extending supplementary frame, the rearward ends of which members are connected by means of a longitudinal member 37, formed throughout with a series of holes 38, which are in direct line with the spaces 21 between the parallel portions 20 and 22 of the aforesaid brackets 19, each pair of said parallel portions 20 of the brackets being provided with adjacent or corresponding holes 39 and each pair of said parallel portions 22 thereof being provided with similar holes 40, while between each pair of the former-mentioned portions is pivoted at 41 the lower end of a rod 42, the upper end of which passes through and plays loosely in the corresponding hole 38 of longitudinal member 37 of the supplementary frame with which the rod is associated, a pin 43 being inserted through the rod above said member 37 to maintain the desired movable connection between the two. Encircling each of said rods 42 of each series thereof is a spiral spring 44, exerting its tension between the upper edges of the parallel portions 20 of the appropriate bracket 19 therefor and the under side of the member 37 of the supplementary frame belonging to the series. Secured between the said parallel portions 20 and 21 of each bracket 19 at a suitable downward and rearward angle or pitch and preferably by means of wooden or other breakable pins 45, passing therethrough and through the appropriate sets of holes 39 and 40 in the two said mentioned parallel portions, is the shank 46 of one of the cutters or knives which I employ, said shank having holes 46ª therethrough and merging into a blade 47, the forwardly-curved edge 48 of which is a cutting edge. Each cutter or knife is bent at 49 to form a continuation 50 of the blade, extending at an obtuse angle thereto, the back or rear edge of such continuation being straight for its length at 51, and the forward edge 52 thereof being practically a straight cutting edge. The form of cutter or knife described and shown has been found exceedingly effective in meeting varying requirements in use and under varying conditions of soil; but in some instances it has been found advantageous to give to the forward cutting edge of each of the blades 47 a more pronounced or deeper outward curve, as indicated at 53 in Fig. 5, for instance. In some instances also I prefer to employ a revolving cutter or colter 54 in advance of the cutting edge of the blade 47 of each knife or cutter, (see Fig. 4,) the same being mounted conveniently in a hanger 55, from the corresponding bracket 19 and which so cuts the soil in advance of the said blade as to prevent the cutter or knife from becoming clogged therewith.

As shown in Fig. 6, the shank of the blade of each cutter or knife may be widened upwardly, as at 56, to give increased strength of attachment thereof to the parallel members 57 of the supporting-bracket 58 therefor, and it is apparent that various other changes may be adopted without departing from the spirit or scope of the invention.

From the foregoing it will be seen that by properly manipulating the operating-levers 32 rearwardly the shafts 29 will be rocked correspondingly, and the supplementary frames 36 37 will be caused to be thrown downwardly, the brackets 19 being thereby also carried downwardly and the cutters or knives caused to enter or penetrate the soil to the depth necessary to effect the cutting and turning of the weeds. The springs 44 on the rods 42 afford a cushioning resistance to the work of the cutters or knives, and it will be seen that due to the independent mounting of each bracket and cutter or knife the latter is permitted to rise and fall in conformity with sinuosities or differences of level of the soil, and, moreover, should either one of the cutters or knives encounter a rock or other solid substance in or beneath the soil the wooden pin or pins supporting the same from its appropriate bracket will break, and thus prevent any injury to the cutter or knife itself or any other part of the harrow. Either series of cutters or knives may be operated independently, as is apparent, it being simply necessary to push the appropriate operating-lever 32 therefor forward to cause the other series to be lifted entirely clear of the soil or ground. It will also be seen that the cutters or knives may be set at any desired angle, and that due to the relation between each bracket 19 and cutter or knife the latter is securely clamped and braced in such manner as to be prevented from turning or shifting laterally in either direction.

Having thus described my invention, I claim as new and desire to secure by Letters Patent—

1. A weeding-harrow, comprising a main frame, duplicate rock-shafts mounted thereon, duplicate rearwardly-extending supplementary frames rigidly supported by said rock-shafts, a series of brackets supported from the main frame to rock with each supplementary frame, an independent cushioning connection between the bracket of each series and the appropriate supplementary frame therefor, embodying a rod and a spring thereon, and means for rocking either or both of the supplementary frames.

2. A weeding-harrow, comprising a main frame, duplicate rock-shafts mounted thereon, duplicate rearwardly-extending supplementary frames rigidly supported by said rock-shafts, a series of brackets supported from the main frame to rock with each supplementary frame, an independent cushioning connection between the bracket of each series and the appropriate supplementary frame therefor embodying a rod and a spring thereon, means for rocking either or both of the supplementary frames, and means for locking either or both of said supplementary frames in lowered or elevated position from the ground.

3. A weeding-harrow, comprising a main frame, duplicate rearwardly-extending supplementary frames supported by and adapted to be rocked thereon, a series of rearwardly-extending brackets supported from the main frame to rock with each supplementary frame, a series of cutters rigidly supported by each series of brackets, connections between the brackets of each series and the supplementary frame therefor, said connections each having slidable relation with said supplementary frame and embodying a cushioning device constructed of a rod and a spring thereon, and means for rocking either or both of the supplementary frames.

4. A weeding-harrow, comprising a main frame, duplicate rearwardly-extending supplementary frames supported by and adapted to be rocked thereon, a series of rearwardly-extending brackets supported from the main frame to rock with each supplementary frame, a series of cutters rigidly supported by each series of brackets, connections between the brackets of each series and the supplementary frame therefor, said connections each having slidable relation with said supplementary frame and embodying a rod and a cushioning device thereon, means for rocking either or both of the supplementary frames, and means for locking either or both of said supplementary frames in lowered or elevated position from the ground.

5. A weeding-harrow, comprising a main frame, duplicate supplementary frames supported rearwardly thereof, and adapted to be rocked thereon, a series of brackets supported from the main frame to rock with each supplementary frame, a series of cutters supported by each series of brackets, and means for rocking either or both of said supplementary frames, each bracket of each series being constructed of duplicate members diverging from each other forwardly and parallel with each other and spaced apart rearwardly and bent under and forwardly.

6. A weeding-harrow, comprising a main frame, duplicate supplementary frames supported rearwardly thereof, and adapted to be rocked thereon, a series of brackets supported from the main frame to rock with each supplementary frame, a series of cutters supported by each series of brackets, and means for rocking either or both of said supplementary frames, each of said cutters being constructed with a pendent shank merging into a blade having a forward cutting edge, and bent at an obtuse angle rearwardly to form substantially a horizontal continuation thereof also having a forward cutting edge.

7. A weeding-harrow, comprising a main frame, duplicate rearwardly-extending supplementary frames supported by and adapted to be rocked thereon, a series of rearwardly-extending brackets supported from the main frame to rock with each supplementary frame, a series of cutters rigidly supported by each series of brackets, connections between the brackets of each series and the supplementary frame therefor, said connections each having slidable relation with said supplementary frame and embodying a cushioning device, means for rocking either or both of the supplementary frames, and a colter supported in advance of the cutter of each series.

8. A weeding-harrow, comprising a main frame, duplicate rearwardly-extending supplementary frames supported by and adapted to be rocked thereon, a series of rearwardly-extending brackets supported from the main frame to rock with each supplementary frame, a series of cutters rigidly supported by each series of brackets, connections between the brackets of each series and the supplementary frame therefor, said connections each having slidable relation with said supplementary frame and embodying a cushioning device, and means for rocking either or both of the supplementary frames, the brackets of each series each being constructed of duplicate members diverging from each other forwardly and braced apart and brought parallel with each other rearwardly and bent under and forwardly, leaving a space between, and one of the cutters of one of each series thereof being adjustably secured at the desired angle within such space.

9. A weeding-harrow, comprising a main frame, duplicate rearwardly-extending supplementary frames supported by and adapted to be rocked thereon, a series of rearwardly-extending brackets supported from the main frame to rock with each supplementary frame, a series of cutters rigidly supported by each series of brackets, connections between the brackets of each series and the supplementary frame therefor, said connections each having slidable relation with said supplementary frame and embodying a rod and a cushioning device thereon, and means for rocking either or both of the supplementary frames, the cutters of the two series being reversely disposed to each other.

10. A weeding-harrow, comprising a main frame, duplicate rock-shafts mounted thereon, duplicate rearwardly-extending supplementary frames rigidly supported by said rock-shafts, a series of rearwardly-extending brackets each constructed of duplicate members diverging from each other forwardly, spacing-collars on each rock-shaft between the brackets belonging thereto, each having a rearwardly-extending arm to which a member of one of the brackets is secured, bracing-sleeves on each rock-shaft between the members of each of the brackets therefor, a series of cutters rigidly supported by each series of brackets, and means for rocking either or both of said rock-shafts to raise or lower either of said supplementary frames together with the brackets and cutters belonging thereto.

11. A weeding-harrow, comprising a main frame, duplicate rearwardly-extending supplementary frames supported by and adapted to be rocked thereon, a series of brackets supported from the main frame to rock with each supplementary frame, a series of cutters for each series of brackets, and breakable supporting devices therefor, connections between the brackets of each series and the supplementary frame therefor, said connections each having slidable relation with said supplementary frame and embodying a cushioning device, and means for rocking either or both of the supplementary frames.

In testimony whereof I have signed my name to this specification in the presence of two subscribing witnesses.

LOUIS MONROE MORROW.

Witnesses:
C. J. BRIGHT,
F. R. FORTNER.